US011299169B2

(12) United States Patent
Chakravarty et al.

(10) Patent No.: US 11,299,169 B2
(45) Date of Patent: Apr. 12, 2022

(54) VEHICLE NEURAL NETWORK TRAINING

(71) Applicant: Ford Global Technologies, LLC, Dearborn, MI (US)

(72) Inventors: Punarjay Chakravarty, Campbell, CA (US); Ashley Elizabeth Micks, Mountain View, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 319 days.

(21) Appl. No.: 16/751,842

(22) Filed: Jan. 24, 2020

(65) Prior Publication Data
US 2021/0229680 A1 Jul. 29, 2021

(51) Int. Cl.
*B60W 50/00* (2006.01)
*G06T 7/70* (2017.01)
(Continued)

(52) U.S. Cl.
CPC ............ *B60W 50/00* (2013.01); *B60W 10/04* (2013.01); *B60W 10/18* (2013.01); *B60W 10/20* (2013.01);
(Continued)

(58) Field of Classification Search
CPC . B60W 2050/0031; B60W 2050/0034; B60W 2050/0035; B60W 60/001; B60W 60/0011; B60V 20/56; B60V 20/58; B60V 20/20; B60V 20/647; B60V 20/70; B60V 20/80; B60V 10/44; B60V 10/443; B60V 10/72; B60V 10/74; B60V 10/75; B60V 10/751; B60V 10/757; B60V 10/764;
(Continued)

(56) References Cited

U.S. PATENT DOCUMENTS

2018/0336297 A1* 11/2018 Sun ................. G01M 17/00
2019/0147582 A1* 5/2019 Lee ................. G06T 5/005
382/156
(Continued)

OTHER PUBLICATIONS

Zhang et al., DeepRoad: GAN-Based Metamorphic Testing and Input Validation Framework for Autonomous Driving Systems, 2018, ASE (Year: 2018).*
(Continued)

*Primary Examiner* — Russell Frejd
*Assistant Examiner* — Sara J Lewandroski
(74) *Attorney, Agent, or Firm* — Frank A. MacKenzie; Bejin Bieneman PLC

(57) ABSTRACT

A computer, including a processor and a memory, the memory including instructions to be executed by the processor to determine six degree of freedom (DoF) data for a first object in a first video image and generate a synthetic video image corresponding to the first video image including a synthetic object and a synthetic object label based on the six DoF data. The instructions can include further instructions to train a generative adversarial network (GAN) based on a paired first video image and a synthetic video image to generate a modified synthetic image and train a deep neural network to locate the synthetic object in the modified synthetic video image based on the synthetic object. The instructions can include further instructions to download the trained deep neural network to a computing device in a vehicle.

20 Claims, 9 Drawing Sheets

(51) Int. Cl.
*G06K 9/62* (2022.01)
*G06K 9/00* (2022.01)
*B60W 10/04* (2006.01)
*B60W 10/20* (2006.01)
*B60W 10/18* (2012.01)
*G06N 3/08* (2006.01)
*G06V 20/56* (2022.01)
*G05D 1/00* (2006.01)
*B60W 60/00* (2020.01)
*H04W 4/44* (2018.01)

(52) U.S. Cl.
CPC ............ *G06K 9/6256* (2013.01); *G06N 3/08* (2013.01); *G06T 7/70* (2017.01); *G06V 20/56* (2022.01); *B60W 60/00* (2020.02); *B60W 2050/0075* (2013.01); *B60W 2050/0083* (2013.01); *B60W 2420/42* (2013.01); *B60W 2520/14* (2013.01); *B60W 2520/16* (2013.01); *B60W 2520/18* (2013.01); *B60W 2556/45* (2020.02); *G05D 1/0088* (2013.01); *G06T 2207/30252* (2013.01); *H04W 4/44* (2018.02)

(58) Field of Classification Search
CPC .. B60V 10/771; B60V 10/774; B60V 10/778; B60V 10/7784; B60V 10/7788; G06T 7/70; G06T 7/73; G06T 7/74; G06T 7/75; G06T 2207/30244; G06T 2207/30252; G06T 2207/30261
See application file for complete search history.

(56) References Cited

U.S. PATENT DOCUMENTS

| | | | |
|---|---|---|---|
| 2019/0272446 A1* | 9/2019 | Kangaspunta | G06K 9/6256 |
| 2021/0201056 A1* | 7/2021 | Potnis | H04W 4/46 |
| 2021/0201085 A1* | 7/2021 | Potnis | G06K 9/6256 |
| 2021/0303732 A1* | 9/2021 | Hutmacher | G06F 21/64 |
| 2021/0303885 A1* | 9/2021 | Hassan | G06K 9/6262 |
| 2021/0303925 A1* | 9/2021 | Hofmann | G06K 9/6256 |
| 2021/0319363 A1* | 10/2021 | Gillberg | G06V 20/10 |
| 2021/0323555 A1* | 10/2021 | Sholingar | B60W 10/18 |
| 2021/0339772 A1* | 11/2021 | Ramamoorthy | B60W 50/0097 |
| 2021/0383209 A1* | 12/2021 | Brahma | G06K 9/6271 |
| 2021/0383616 A1* | 12/2021 | Rong | G06T 3/0093 |
| 2022/0012536 A1* | 1/2022 | Wang | G06V 10/454 |

OTHER PUBLICATIONS

Stein et al., "GeneSIS-RT: Generating Synthetic Images for training Secondary Real-world Tasks", arXiv:1710.04280V1, Oct. 11, 2017.

\* cited by examiner

300

302

500

VEHICLE NEURAL NETWORK TRAINING

BACKGROUND

Vehicles can be equipped with computing devices, networks, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway.

DETAILED DESCRIPTION

Figure 1:
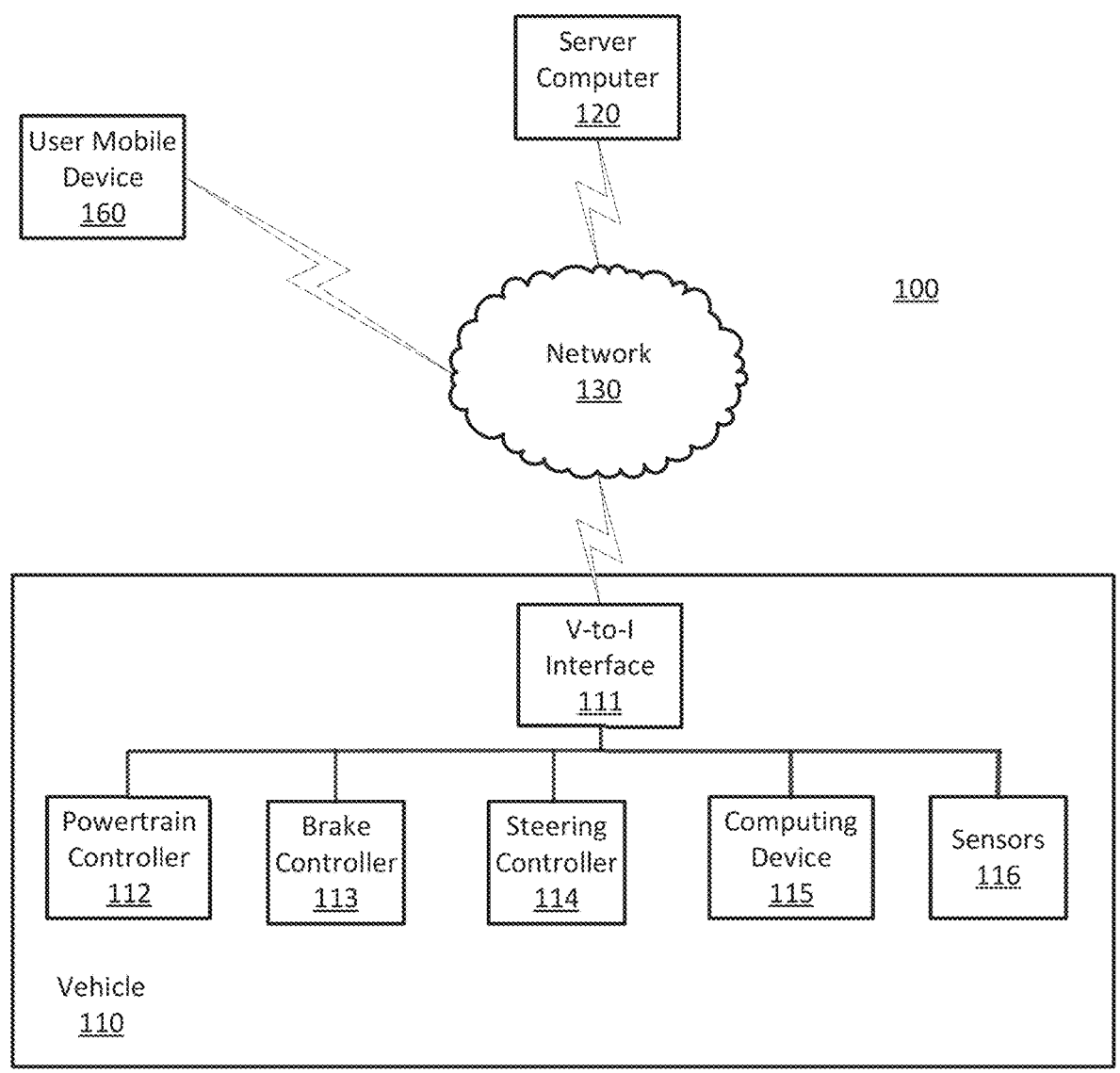
FIG. 1 is a diagram of an example traffic infrastructure system.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous mode, none of these are controlled by a computer.

A deep neural network can be trained to identify and determine locations for objects including other vehicles in an environment around a vehicle based on image data acquired by vehicle sensors. A computing device in a vehicle can determine a vehicle path upon which to operate the vehicle based on an identified object location output by the deep neural network. A vehicle can operate on a roadway based on the vehicle path by determining commands to direct the vehicle's powertrain, braking, and steering components to operate the vehicle to travel along the path. Deep neural networks can be trained to identify and locate objects in video data using labeled training data, where objects in video data are identified and located before processing with the deep neural network.

Providing labeled real world video data can be expensive and time-consuming. Training deep neural networks can be improved by the use of labeled synthetic video data. Synthetic video data is video data generated by photorealistic rendering software that produces labeled synthetic video data. Labeled synthetic data can provide unsatisfactory training results because synthetic video data in some examples does not model real world video data realistically enough to enable training deep neural networks to identify and locate objects in real video data. Techniques described herein improve deep neural network training by determining six degree of freedom (DoF) location and orientation data for objects in acquired real world video data and using the six DoF data to generate labeled synthetic video data based on the six DoF data. The labels from the labeled synthetic video data can be transferred to the real world video data to generate paired real and synthetic labeled video data.

The paired real labeled video data and synthetic labeled video data can be used to train a generative adversarial network (GAN) to produce modified synthetic video data that more closely corresponds to real video data than unmodified synthetic video data. Training deep neural networks based on modified synthetic video data improves the training of deep neural networks by generating large numbers (>1000) synthetic video images that accurately correspond to real world video data. Modifying synthetic video images with a trained GAN can generate large numbers of modified synthetic images that can be used to train a deep neural network with higher accuracy and lower cost in less time than training a deep neural network based on labeled real world video data.

Image data generated by other imaging modalities including lidar, radar, and ultrasound can be used to train deep neural networks to operate a vehicle. Image data generated by other imaging modalities can be augmented by synthetic data in the same fashion that video data can be augmented by techniques described herein. Six DoF data regarding vehicles can be acquired in parallel with lidar, radar, or ultrasound data and modified synthetic image data can be generated by a GAN corresponding to each modality. The resulting modified image data can be used to train a deep neural network to operate a vehicle based on the lidar, radar, or ultrasound data as described herein.

In addition to operating a vehicle by acquiring video image data with a video sensor included in a vehicle, techniques described herein can be used to train a deep neural network to process data acquired by a stationary sensor included in a traffic infrastructure system. The traffic infrastructure system can acquire image data from sensor modalities including one or more of video, lidar, radar, and ultrasound and process the acquired image data using techniques described herein. The results of processing the acquired image data can be used by the traffic infrastructure system to determine the identity and locations of objects included in a traffic scene. The data regarding identity and locations of objects in a traffic scene can be used to determine vehicle paths for vehicles in a traffic scene. The data regarding vehicle paths can be downloaded to vehicles in the traffic scene to assist a computing device in a vehicle to operate the vehicle, for example.

Disclosed herein is method including determining six degree of freedom (DoF) data for a first object in a first video image, generating a synthetic video image corresponding to the first video image including a synthetic object and a synthetic object label based on the six DoF data. A generative adversarial network (GAN) can be trained based on a paired first video image and a synthetic video image to generate a modified synthetic image, a deep neural network can be trained to locate an object in the modified synthetic image based on the synthetic object label and the trained deep neural network can be downloaded to a computing device in a vehicle. The synthetic video image can be generated by a photorealistic rendering process to correspond with the first video image including rendering the synthetic object to correspond with a location of the first object in the first video image based on the six DoF data. The six DoF data can include a location in three-dimensional (3-D) space and an orientation in 3-D space, both determined with respect to orthogonal three-dimensional axes, wherein the orthogonal three-dimensional axes are determined with respect to a global coordinate system.

The global coordinate system based on latitude, longitude, and altitude, location can be measured in x, in x, y, and z coordinates and orientation is measured by roll, pitch, and yaw specified with respect to the global coordinate system. The six DoF data can be determined by processing the first video image using machine vision techniques to determine correspondence between locations of first data points on the first object in the first video image and locations of measured data points determined by measuring locations of data points on one or more of the first object or engineering drawings of the first object. The six DoF data can be determined by minimizing differences between locations of the first data points and the measured data points by non-linear curve fitting. The six DoF data can be determined based on engineering drawings of the first object and virtual camera point of view. The virtual camera point of view can include six DoF data for an optical axis of the virtual camera and magnification data for the virtual camera. The GAN can include a generative network and an adversarial network. The GAN can add image feature data from the first video image to the synthetic video image to generate the modified synthetic video image. The deep neural network can include convolutional layers and fully-connected layers. The deep neural network can be trained to locate the first object by comparing back propagated output states with the synthetic object label. The vehicle can be operated by processing acquired video data with the downloaded deep neural network to locate one or more objects in the acquired video data. The vehicle can be operated by controlling vehicle powertrain, steering and brakes based on locations of the one or more objects in the acquired video data.

Further disclosed is a computer readable medium, storing program instructions for executing some or all of the above method steps. Further disclosed is a computer programmed for executing some or all of the above method steps, including a computer apparatus, programmed to determine six degree of freedom (DoF) data for a first object in a first video image, generate a synthetic video image corresponding to the first video image including a synthetic object and a synthetic object label based on the six DoF data. A generative adversarial network (GAN) can be trained based on a paired first video image and a synthetic video image to generate a modified synthetic image, a deep neural network can be trained to locate an object in the modified synthetic image based on the synthetic object label and the trained deep neural network can be downloaded to a computing device in a vehicle. The synthetic video image can be generated by a photorealistic rendering process to correspond with the first video image including rendering the synthetic object to correspond with a location of the first object in the first video image based on the six DoF data. The six DoF data can include a location in three-dimensional (3-D) space and an orientation in 3-D space, both determined with respect to orthogonal three-dimensional axes, wherein the orthogonal three-dimensional axes are determined with respect to a global coordinate system.

The computer can be further programmed to measure location in x, in x, y, and z coordinates and orientation by roll, pitch, and yaw specified with respect to the global coordinate system. The six DoF data can be determined by processing the first video image using machine vision techniques to determine correspondence between locations of first data points on the first object in the first video image and locations of measured data points determined by measuring locations of data points on one or more of the first object or engineering drawings of the first object. The six DoF data can be determined by minimizing differences between locations of the first data points and the measured data points by non-linear curve fitting. The six DoF data can be determined based on engineering drawings of the first object and virtual camera point of view. The virtual camera point of view can include six DoF data for an optical axis of the virtual camera and magnification data for the virtual camera. The GAN can include a generative network and an adversarial network. The GAN can add image feature data from the first video image to the synthetic video image to generate the modified synthetic video image. The deep neural network can include convolutional layers and fully-connected layers. The deep neural network can be trained to locate the first object by comparing back propagated output states with the synthetic object label. The vehicle can be operated by processing acquired video data with the downloaded deep neural network to locate one or more objects in the acquired video data. The vehicle can be operated by controlling vehicle powertrain, steering and brakes based on locations of the one or more objects in the acquired video data.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160. Server computer 120 can also function as a computing device 115 included in an edge computing node, where an edge computing node is a computing device 115, e.g., as part of a roadside infrastructure element or the like, that acquires sensor data and communicates with vehicles 110 in a local portion of one or more of a roadway, parking lot or parking structure, etc.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
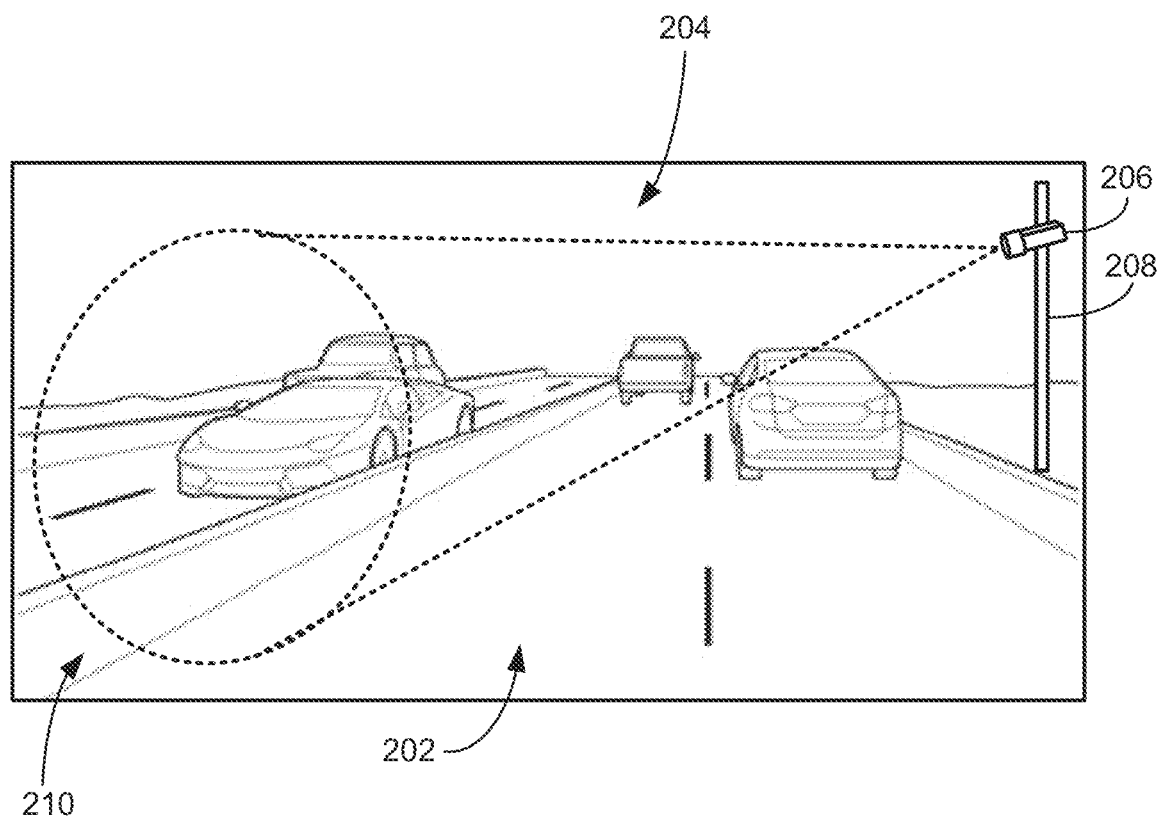
FIG. 2 is a diagram of an example traffic scene including a video sensor.

FIG. 2 is a diagram of a traffic scene 200. Traffic scene 200 includes a roadway 202 and vehicles 204 operating on the roadway 202. Traffic scene 200 also includes a video sensor 206 mounted on a pole 208. Video sensor 206 can acquire video image data from a field of view 210. Video image data acquired by a video sensor 206 will include images of vehicle 204 that are within the field of view 210 at the moment the video image data is acquired. Video image data acquired by a video sensor 206 can be communicated to a computing device 115 included in a traffic infrastructure system 100. A computing device 115 that communicates with a video sensor 206 arranged so that the field of view 210 covers a portion of a roadway 202 including vehicles 204 can be referred to as an edge computing node of a traffic infrastructure system 100. Edge computing nodes, i.e., computers 115, can acquire video image data regarding a traffic scene 200 and communicate the video image data to a computing device 115 in a vehicle 110 via a server computer 120.

Edge computing node computers 115 can also process the video image data to extract data regarding the traffic scene 200 and communicate the extracted data to a computing device 115 in a vehicle 110. In this example an edge computing node computer 115 can acquire video image data and ground truth related to the video image data and use it to train a deep neural network that can be used to operate a vehicle 110. Ground truth is data regarding identities and locations of objects including vehicles in video image data determined independently from sources other than processing the video image data with a deep neural network. For example, identities and locations of objects in a traffic scene 200 can be identified and measured by a human observer. Video data for training deep neural networks can also be acquired by video sensors included in a vehicle 110.

Figure 3:
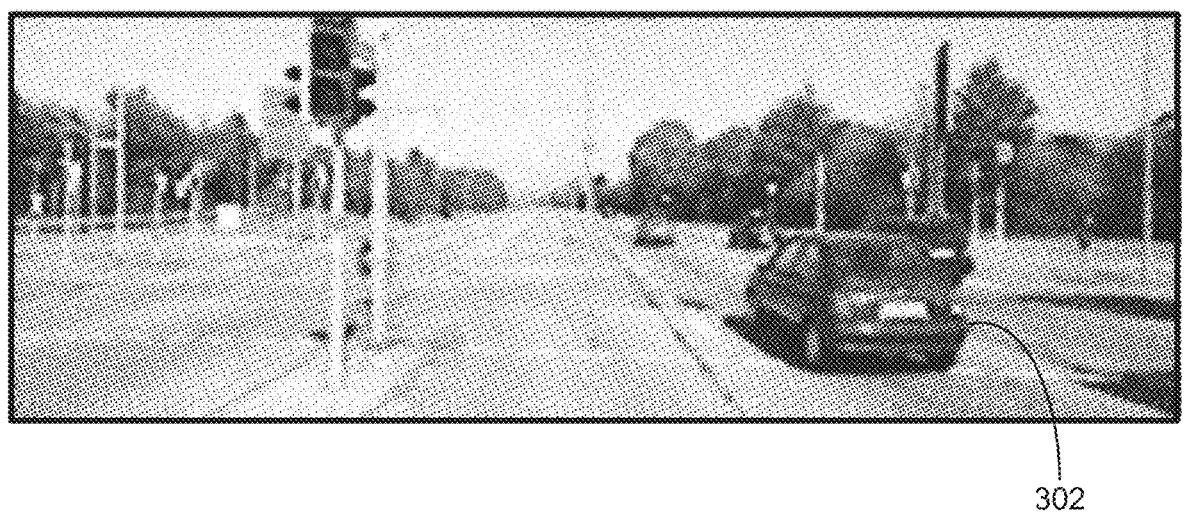
FIG. 3 is a diagram of an example color video image of a traffic scene.

FIG. 3 is a diagram of a color video image 300, rendered in black and white to comply with Patent Office regulations. Color video image 300 can be acquired by a video sensor 206 and communicated to an edge computing node computer 115 included in a traffic infrastructure system 100, for example. Color video image 300 can also be acquired by a video sensor included in a vehicle 110. Color video image can include an image of a vehicle 302. Color video image 300 can be used to train a deep neural network to identify and locate a vehicle 302 by determining ground truth data regarding the identity and location of the vehicle 302 where ground truth data is defined as independently determined data regarding a video image including identities and locations of objects included in the video image. For example, a deep neural network can be trained to determine identities and locations of objects included in a video image. The deep neural network can be trained to identify and locate objects by training the deep neural network using a training data set of labeled video images where the labels include the identities and locations of objects determined independently of the deep neural network. In this example the identities and locations of the objects are determined by machine vision software programs that identify and locate objects in six DoF as discussed below in relation to FIG. 4, below.

The independently determined identities and locations determined by six DoF techniques are referred to as ground truth. Six DoF techniques improve determination of object identification and location of object by a user using image processing software programs to permit users to draw outlines of objects included in the video images and measure the locations of objects in pixel coordinates. For example, a vehicle make and model can be identified in a video image by a user and the size of the vehicle in pixels can be measured in the video image data and compared to real world measurements of that make and model vehicle. A user can estimate a location and orientation based on this measurement data. Six DoF techniques can determine the location and orientation of a vehicle more accurately using fewer computer resources than user-based techniques. Determining data regarding location and orientation of objects in real world color video images 300 using six DoF techniques can improve training of deep neural networks by providing more training image data sets with more accurate ground truth using less computer resources in less time that user-based techniques.

A problem with user labeling of objects in video images for determining ground truth including object identity and locations for data sets used for training deep neural networks is that user determining of object labels can be expensive and time consuming. User determination of object labels including identifying and locating objects including vehicles, pedestrians and roadway in a single video image can take several hours of computer time and can cost more than a thousand dollars per image including computer time. Object labels determined in this fashion can include errors generated by differences in object labels determined by different users, because the users are estimating location and orientation data. These differences in object labels can cause deep neural networks trained using user-determined labels to produce inconsistent and unreliable results, requiring additional training, testing, and verification of neural network training which increases the computing resources and cost required to train deep neural networks.

As disclosed herein, it is possible to generate synthetic video data and ground truth using photorealistic synthetic image rendering software such as UNREAL ENGINE™. UNREAL ENGINE a photorealistic rendering process that inputs scene description and generates photorealistic output images corresponding to user specified light sources and virtual video cameras. UNREAL ENGINE includes a suite of integrated development tools for the design and build of games, simulations, and visualizations available from Epic Games, Inc. (see www.unrealengine.com). Ground truth related to objects in a synthetic video image is readily available because label data regarding the identity and location of objects in the synthetic image are required as input to the process that generates the image. A first step in generating a labeled color video image for use in training a deep neural network is to determine six degree of freedom (DoF) data for objects in the color video image. Six DoF data can be generated based on computer aided design (CAD) data.

Figure 4:
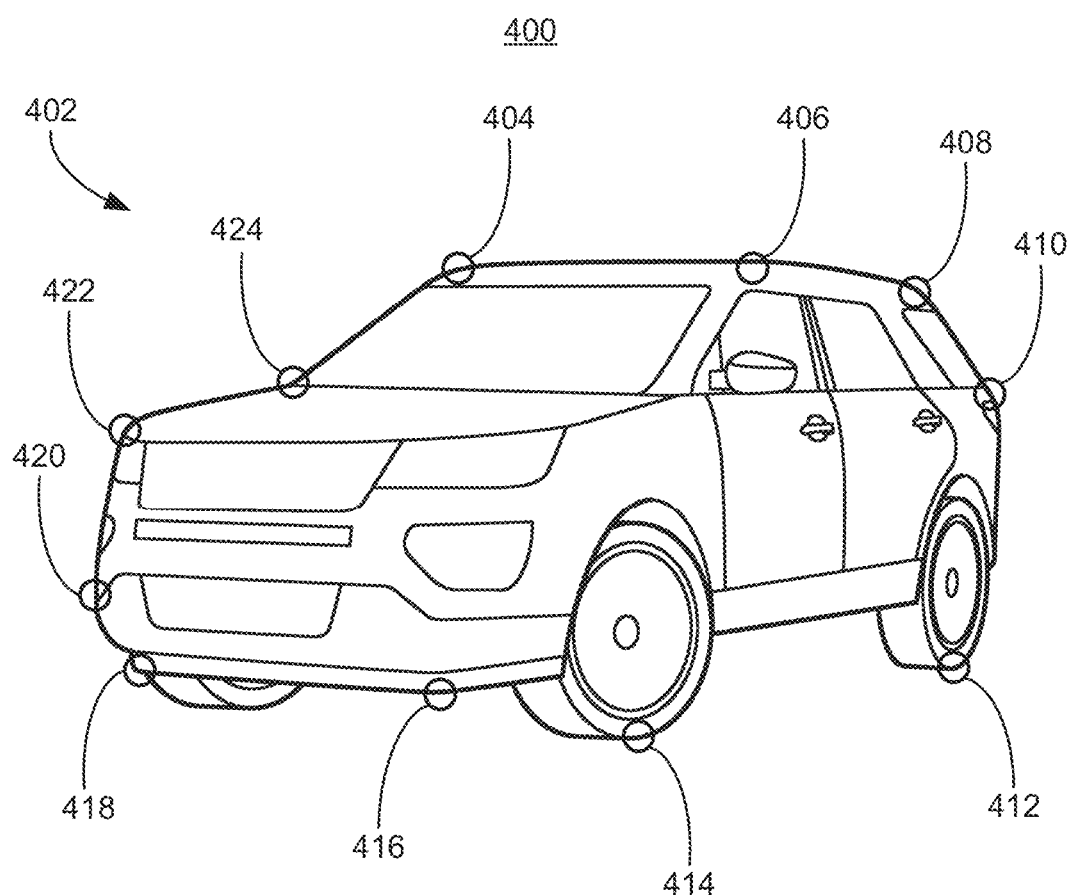
FIG. 4 is a diagram of example computer aided design vehicle image.

FIG. 4 is a diagram of a CAD vehicle image 400 rendered as a black and white line drawing to conform to Patent Office regulations. CAD vehicle image 400 can be used to determine six DoF location of vehicle 302 in a color video image 300. CAD vehicle image 400 is a two-dimensional (2D) image produced by rendering CAD data, which is mathematical data that describes the surfaces and volumes of a 3D object. CAD data can include engineering drawings of an object, for example. Rendering can produce a 2D CAD vehicle image 400 of a three-dimensional (3D) object by determining a virtual camera point of view from which to project the CAD data onto a 2D plane.

A virtual camera is the means by which a CAD rendering program generates a 2D CAD vehicle image 400 from the CAD data, including engineering drawings. The rendering process can generate rays that pass from a virtual image sensor through a virtual lens, obeying the laws of physics just as if the image sensor and lens were physical objects. The rendering program inserts data into the virtual image sensor corresponding to the appearance of the portion of the 3D CAD data that a ray of light emitted by the portion of the 3D CAD data and passing through a physical lens would produce on a physical image sensor. By situating a virtual camera at a selected six DoF location and orientation with respect to the 3D CAD data, a 2D vehicle image 400 corresponding to a selected viewpoint with respect to the vehicle can be generated.

The virtual camera point of view includes six DoF data for an optical axis of the virtual camera and data regarding the magnification of the virtual camera lens. The virtual camera point of view is determined based on the location and orientation of a virtual camera with respect to a 3D model of the object corresponding to the CAD data. Projecting the CAD data onto a 2D plane corresponds to determining which edges and surfaces of the CAD data object would be visible to a camera acquiring an image of the CAD data object from the selected location and orientation. Because the CAD vehicle image 400 was generated from CAD data based on a virtual camera at a selected location and orientation, data regarding the location and orientation of the object illustrated in the CAD vehicle image 400 is known. A plurality of CAD vehicle images 400 can be generated from a plurality of location and orientations of virtual cameras.

A process to determine the location and orientation of a vehicle 302 in a color video image 300 can begin by determining the location and orientation of the video sensor 206 with respect to a roadway 202. The location and orientation of the video sensor 206 can be determined by physical measurement of the video sensor 206 or instrumentation including GPS sensors and inertial measurement units included in the video sensor 206. These measurements can determine the location and orientation of the video sensor 206 field of view 210 with respect to a roadway 202 in real world global coordinates can be determined.

Real world global coordinates can be defined as three-dimensional (3D) x, y, and z spatial coordinates defined in relation to real world 3D axes determined by latitude, longitude and altitude, for example, along with 3D roll, pitch, and yaw rotational coordinates defined with respect to rotations about the x, y, and z axes. By combining location and orientation of the video sensor 206 field of view 210 with the magnification of a lens included in the video sensor 206 and the location of a plane corresponding to the roadway 202, the real world locations of objects located on the roadway can be determined based on their locations in pixel coordinates in a color video image.

Objects including a vehicle 302 can be identified in color video images using machine vision techniques including deep neural networks. These techniques can identify and locate objects in a color video image 300 based on correlating previously acquired images of objects including vehicles 302 with the color video image 300. These techniques can locate a vehicle and identify the type of vehicle including make and model, but cannot determine the 3D location and orientation of the object. When the machine vision software has identified the type of vehicle 302 in the color video image 300, a CAD vehicle image 400 of the type of vehicle 302 in the color video image 300 can be recalled from a library of CAD vehicle images 400.

A six DoF pose of a vehicle 302 in a color video image 300 can be determined by processing the image of a vehicle 302 with machine vision software that determines vehicle features 404, 406, 408, 410, 412, 414, 416, 418, 420, 422, 424, collectively vehicle features 402. Vehicle features 402, illustrated as circles in FIG. 4, are locations on a 2D image of a vehicle 302 or CAD vehicle image 400 defined by geometric relationships of edges as they join to form vertices in the image data. For example, vehicle feature 404 is formed by the curved section of vehicle 400 outline formed at the joining of the front edge of the windshield with the outline of the top of the vehicle 400. Each vehicle feature 402 is located on an image of a vehicle 400 by the shape and orientation, of lines formed by the outline of the vehicle image 400 and interior lines formed by performing edge detection on the vehicle image 400 using machine vision techniques including Canny edge detection. Canny edge detection is a machine vision technique that can reliably and repeatably detect outlines and interior lines on vehicle images 400.

Machine vision techniques can determine vehicle features 402 based on feature detection algorithms that detect configurations of detected edges by determining geometric edge configurations. Geometric edge configurations can include curvature, orientations, locations, angle, and number of edges at which two or more edges join, for example. Feature detection algorithms can detect locations on a vehicle image 400 where unique curvatures, orientations, locations, angles and numbers of lines join and store them as vehicle features 402 corresponding to a particular make and model of vehicle image 400. By processing the rendered CAD vehicle image 400 to detect vehicle features 402 and the processing an acquired image of a vehicle 302, a set of vehicle features 402 can be determined based on the real world image of a vehicle 302 from a real world video image 300 and correspondence between the real world vehicle features 402 and vehicle features 402 generated based on the CAD vehicle image 400 can be determined. Photorealistic rendering software programs can use a six DoF location of a virtual camera and characteristics of the virtual camera including an optical axis and magnification of a virtual lens to generate traffic scenes and objects including a CAD vehicle image 400.

Because the six DoF pose of the CAD vehicle image 400 is known based on the virtual camera location used to generate the CAD vehicle image 400, the sets of vehicle features 402 acquired from a CAD vehicle image 400 can be compared to vehicle features 402 acquired by processing a real world color video image 300 to determine to determine a real world DoF pose including location and orientation for the vehicle 302. Real world six DoF location and orientation data is defined as three-dimensional (3D) x, y, and z spatial coordinates defined in relation to real world 3D axes determined by latitude, longitude and altitude, for example, along with 3D roll, pitch, and yaw rotational coordinates defined with respect to rotations about the x, y, and z axes as discussed above.

A color video image 300 of a vehicle 302 can be processed by a computing device to determine vehicle features 402 on the image of the vehicle 302 using edge detection and geometric analysis machine vision techniques as discussed above. By processing the color video image of a vehicle 302 using similar machine vision techniques as were used to detect vehicle features 402, detected vehicle image features will be similar to vehicle features 402 detected on CAD vehicle image 400. The technique described herein can determine correspondence between locations of first data points corresponding to vehicle features 402 determined in the image of the vehicle 302 and locations of measured data points corresponding to vehicle features 402 determined in the CAD vehicle image 402. A six DoF pose for vehicle 302 can be determined by solving the following perspective-n-point projection equation:

$$R, t = \underset{R, t}{\operatorname{argmin}} \sum_j \left\| u_j - \prod (RX_j + t) \right\|^2 \qquad (1)$$

Equation (1) calculates rotation R, measured in roll, pitch, and yaw, and translation t, measured in x, y, and z by determining a minimum with respect to R and t. The minimum is calculated by summing the squared differences between the n locations of vehicle image features $u_j$, where $j \in \{1, \ldots n\}$, and n locations of CAD data vehicle features 402 $X_j$, where the vehicle features 402 $X_j$ are vehicle features 402 from the sets of vehicle features 402. The six DoF pose selected will be from the set of vehicle features 402 that minimizes equation (1).

Equation (1) selects values of R and t which minimize the difference between the locations of detected vehicle image features $u_j$ and locations of CAD data vehicle features 402 $X_j$ rotated and translated to most closely match the detected vehicle image features $u_j$ using non-linear least squares curve fitting techniques including the Levenberg-Marquardt algorithm. Levenberg-Marquart techniques can determine a minimum value for an equation by performing non-linear curve fitting, where the algorithm interpolates between Gauss-Newton techniques and gradient descent techniques to determine a local minimum for the curve even if the algorithm starts very far from the actual minimum value. At each step the vehicle image features $u_j$ are fit to a vehicle model that includes CAD data vehicle features 402 $X_j$ rotated and translated to most closely match the detected vehicle image features $u_j$. The order in which the steps are systematically varied can depend upon the relative minimum values of the steps to efficiently determine an overall minimum value. The values of R and t determined by equation (1) correspond to the six DoF pose of the vehicle in the color video image 300 of a vehicle 302 measured with respect to a six DoF pose of a video sensor 206. The six DoF pose of the vehicle can be transformed into global coordinates by combining corresponding roll, pitch, and yaw and x, y, and z elements from the vehicle six DoF pose with the same elements from the camera six DoF pose and data regarding the field of view 210 measured in global coordinates to yield the six DoF pose of the vehicle in global coordinates.

Figure 5:
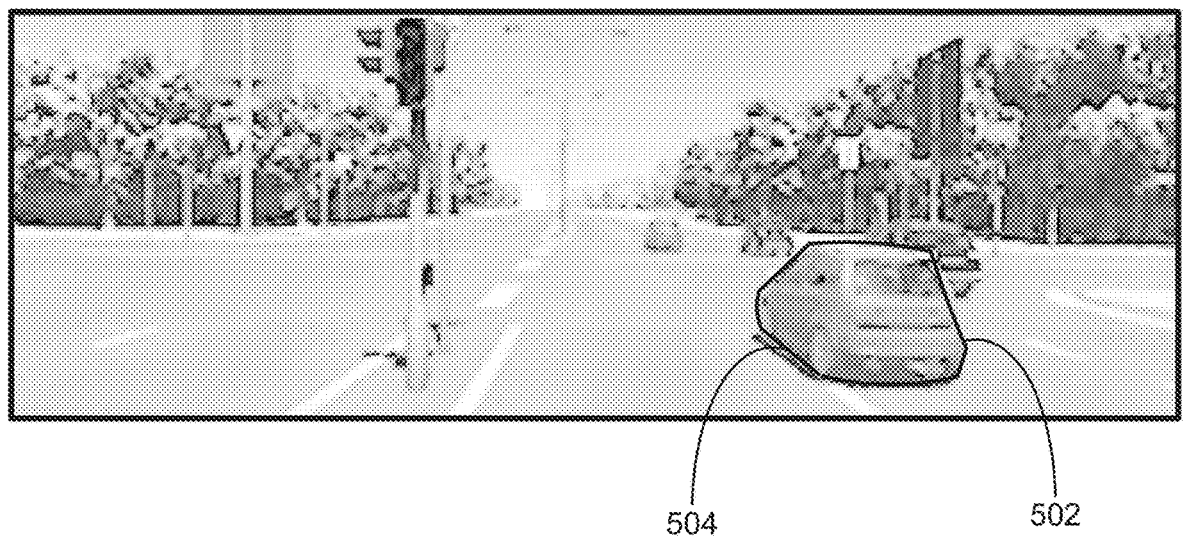
FIG. 5 is a diagram of an example labeled synthetic video image.

FIG. 5 is a diagram of a synthetic video image 500, rendered in black and white to conform to Patent Office regulations. Synthetic video image 500 includes a synthetically rendered vehicle 502 and a vehicle label 604. When the six DoF process determines a six DoF pose of a vehicle 302 from a video image 300, the data regarding the type of vehicle 302 and the six DoF pose can be input to a photorealistic rendering software program to render a synthetic video image 500 including a synthetic rendered vehicle 502. Because the vehicle 502 was synthetically rendered, ground truth vehicle label 504 data regarding the identity and location of the vehicle based on both the real world pose of the vehicle and the appearance of the rendered vehicle 502 in the synthetic video image 500 is available. Because the synthetic video image 500 was rendered based six DoF data acquired from a real world video image 300, the ground truth label data can be accurately transferred to the real world color video data 300. This permits the real world color video data 300 along with the label data from the synthetic video data to be used to train a deep neural network without requiring user identification and location of the vehicle 302.

Synthetic video image 500 includes a synthetically rendered vehicle 502 and a vehicle label 504. Although the synthetically generated video data is "photorealistic," meaning that it appears to an observer almost as if it was acquired using a real world video sensor looking at a real world traffic scene, it is a problem that enough differences exist between a real world video image and a synthetically generated video image of a similar traffic scene to prevent a deep neural network trained on synthetic video images and accompanying ground truth to correctly identify and locate real world objects included in a real world video image. Compared to color video image 300, synthetically generated video image 500 includes less image detail included in the objects including vehicles and roadways. For example, synthetic video images 500 do not include detailed features included in a real world color video image 300. These features can include incidental objects such as debris and containers, etc. Features can include textures found on objects such as roadways caused by dirt, cracks, repairs, partially missing lane markers and other real world textures. Synthetic image rendering programs cannot match the randomness and variety of objects, including textures, occurring in a real world color video image 300 such as bumper stickers, roof racks, dirt, and sometimes dents found on real world vehicles. Lack of image detail and feature differences between synthetically rendered video image 500 and a real world color video image 300 prevents synthetically rendered video image 500 from being used to train deep neural networks despite their advantage in including accurate vehicle labels 604 based on the data used to generate the synthetic video image 500.

Figure 6:
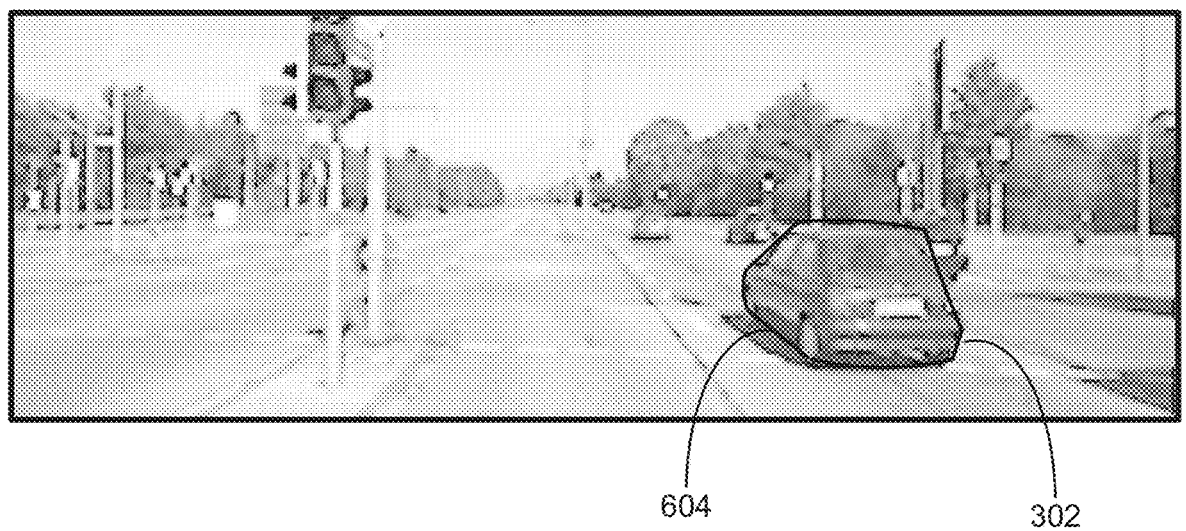
FIG. 6 is a diagram of an example labeled color video image.

FIG. 6 is a diagram of a color video image 300 from FIG. 3, rendered in black and white to comply with Patent Office regulations. Color video image 300 includes an image of a vehicle 302 and a vehicle label 604, transferred from vehicle label 504 from synthetic video image 500. Label 604 can be transferred to color video image 300 because the label 604 was generated based on a synthetic image 500 with a synthetic vehicle image 502 generated based on six DoF data determined based on the color video image of vehicle 302. Label 604 therefore corresponds accurately to the size, shape, location and orientation of vehicle 302 and includes data regarding the identity and pose of vehicle 302 determined based on data output by the photorealistic rendering software that generated synthetic video image 500 and six DoF data generated by the process described in relation to FIG. 4. Adding vehicle label 604 to real world color video image 300 generates paired real and synthetic images that include similar objects including vehicles at similar locations with similar labels.

Figure 7:
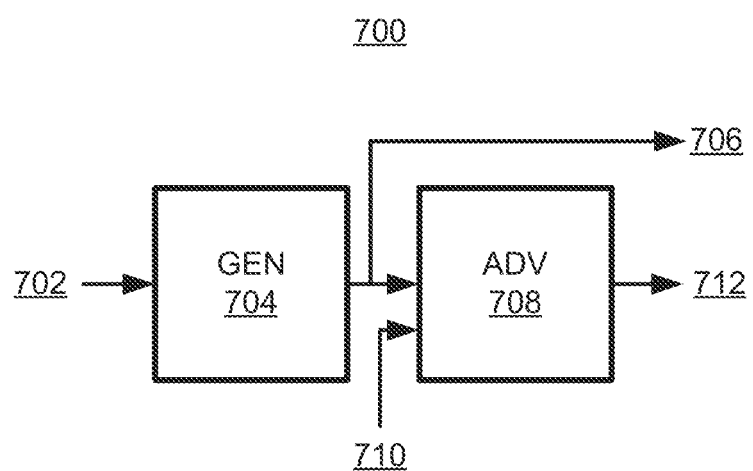
FIG. 7 is a diagram of an example generative adversarial network.

FIG. 7 is a diagram of a generative adversarial network (GAN) 700. A GAN 700 is a neural network that can be trained to modify synthetic image data to appear more like real world image data. As discussed above in relation to FIG. 5, synthetic image data does not include random pixel data corresponding to detailed image feature data including objects, dirt, cracks repairs, etc. A GAN 700 can be trained using paired real world image data and synthetic image data to modify synthetic image data to include detailed features and thereby modify the synthetic image data to appear more like real world image data. A GAN 700 can be trained using paired real world and synthetic image data then be used to modify a large number (>1000) of synthetic images that can be used to train a deep neural network as discussed below in relation to FIG. 7 to identify and locate objects including vehicles in real world video images acquired by video sensors included in a vehicle 110. The identity and location of an object in the real world video image can be used by a computing device 115 in a vehicle 110 to operate the vehicle 110.

A GAN 700 includes a generative network (GEN) 704 and an adversarial network (ADV) 708. The generative network 704 inputs a synthetic video image 500 and modifies the synthetic video image using convolutional layers to correspond to a real world video image and output a modified synthetic image 706 by adding image features corresponding to real world features and textures to the synthetic video image 500. The GAN 700 is trained to generate modified synthetic video images 706 that correspond to real world video images by adversarial network 708. Adversarial network 708 is trained by inputting 710 paired synthetic video images 500 and real video images 300 along with ground truth that indicates which image is real and which image is synthetic. Based on the input paired synthetic and real images and the ground truth, adversarial network 708 learns to distinguish between real and synthetic images. Following training of the adversarial network 708, the generative network 704 is trained to modify an input synthetic video image 702 to correspond to a real world video image by back propagating a result 712 from the adversarial network 708 back to the generative network 704 indicating how closely the modified synthetic image 706 corresponds to a real world image.

Once trained, a GAN 700 can be iteratively trained by inputting 710 paired real world video images 300 along with modified synthetic images 706 corresponding to the real world video images 300 along with ground truth indicating which images are real and which images are synthetic. This re-training can improve the ability of the adversarial network 708 to discriminate between real and synthetic images and thereby improve the quality of the output modified synthetic images 706.

Once the GAN 700 is trained using paired real world color video images 300 and synthetic video images 500, the GAN 700 can be used to modify synthetic video images 702 generated without a paired real world image. In this fashion large numbers of modified synthetic video images that appear as if they were generated by real world video sensors can be obtained for training a deep neural network. Training a deep neural network can require thousands or millions of modified synthetic images that include a large variety of traffic scenes. Generating thousands or millions of real world video images and labeling them with object labels can be prohibitively expensive and time consuming. Techniques described herein can greatly reduce the time and expense of generating training data for deep neural networks by generating modified synthetic video images 706 that correspond to real world video data including detailed image features corresponding to real world image data generated by a GAN trained using paired real world and synthetic image data. The modified synthetic video images 706 include object label data required to train a deep neural network because the modified synthetic images 706 are generated from synthetic video images 500. Synthetic video images are rendered from mathematical descriptions of traffic scenes that include six DoF data regarding the objects rendered in the synthetic image as discussed above in relation to FIG. 5. Because the objects are generated from six DoF data, object labels can be generated that can be used to train a deep neural network to identify and locate the objects in modified synthetic video data.

Labeled modified synthetic images 706 can be used to train a deep neural network to identify and locate objects including vehicles in real world video images because modified synthetic video image 706 corresponds to a realistic real world image 300. Because modified synthetic video images 706 are based on six DoF data regarding objects in the synthetic video image 706, the modified synthetic video images 706 include labels that can be used as ground truth regarding the identity and location of vehicles included in the modified synthetic video images 706. This technique improves training of a deep neural network because the ground truth data corresponding to objects including vehicles is generated by the rendering software and does not require expensive and time consuming user processing to determine the ground truth data. Other objects occurring in modified synthetic video data 706 can include vehicles, pedestrians, and roadways. Modified synthetic video images 706 generated by GAN 700 can be used to train a deep neural network to be used to operate a vehicle 110 because the modified synthetic video images 706 closely resemble real world color video images 300. Modified synthetic video image 706 correspond to real world color video images 300 because GAN 700 adds real world image features to synthetic video images 500. Real world image features including textures include dirt, cracks, repairs, dents, scratches, etc. on both roadways and objects that occur in real world video images.

Figure 8:
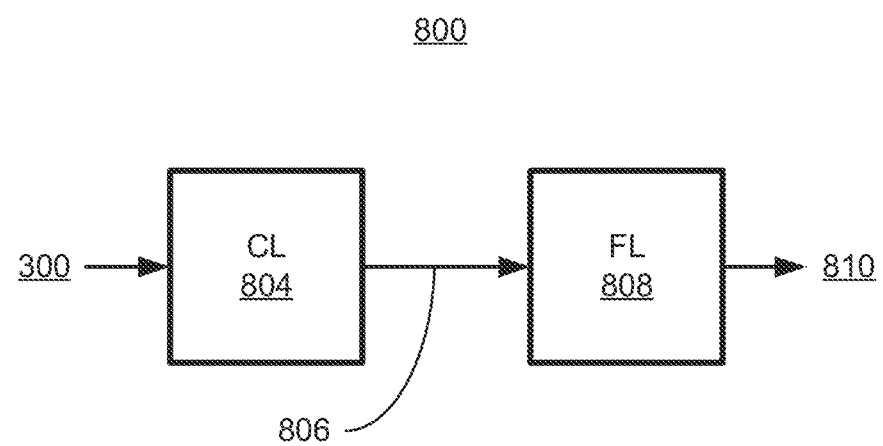
FIG. 8 is a diagram of an example deep neural network.

FIG. 8 is a diagram of an example deep neural network 800 that can be trained to operate a vehicle 110. A deep neural network 800 can be a software program executing on a computing device 115 in a vehicle 110. Deep neural network 800 can input a color video image 300 acquired by video sensors included in a vehicle 110. The video sensor acquires one or more color video images 300 of an environment around a vehicle 110. A color video image 300 of an environment around a vehicle 110 can include images of objects including vehicles 302, pedestrians and roadways around the vehicle 110. A deep neural network 800 can be trained using a large number (>1000) of modified synthetic video images 706 that include six DoF data regarding objects in the modified synthetic video images 706. The six DoF data regarding objects in the modified synthetic video image can be processed to determine labels 604 corresponding to identity and location of objects including vehicles 502 in the synthetic video images 706. Because the objects including vehicles 502 were determined based on six DoF data the labels can be used as ground truth to train a deep neural network 700.

Once trained using modified synthetic video images 706, deep neural network 700 can input a color video image 300 to convolutional layers (CL) 804. Convolutional layers 804 convolve the input color video image 300 with convolutional kernels determined by training the deep neural network 800 using modified synthetic video image 706 to determine hidden variables 806 that correspond to determined and located objects in a color video image. The hidden variables 806 are input to fully-connected layers (FL) 808 that process the hidden variables 806 to determine output states 810 that correspond to identities and locations of objects occurring in input color video image 300. Output states 810 corresponding to identities and locations of objects in a color video image 300 can be communicated to a computing device 115 in a vehicle 110 to be used to operate the vehicle 110. For example, a computing device 115 can use output states 810 to determine a polynomial function that describes a vehicle path upon which to operate a vehicle 110. The vehicle path can be determined so that when a vehicle 110 is operated upon the vehicle path, the vehicle 110 will avoid contact with objects in an environment around the vehicle 110 based on the identities and locations of the objects included in the output states 810.

A deep neural network 800 can be trained by inputting a modified synthetic video image 706 and processing the modified synthetic video image 706 a plurality of times using a plurality of different sets of parameters to program the convolutional layers 804 and the fully connected layers 808. For each set of parameters, the output state 810 resulting from the set of parameters is backpropagated to the input to be compared to the ground truth corresponding to the input modified synthetic video image 706, in this example the identity and location of objects in the input modified synthetic video image 706. When the identity and location included in output state 810 correctly corresponds to the identity and location of objects included in the ground truth data, the set of parameters that generated the output state 810 is stored in memory as learned parameters. Storing learned parameters in memory to be recalled when processing input data with a deep neural network corresponds to training a deep neural network. Because the modified synthetic video image 706 has been generated by GAN 700 to include image features corresponding to real world color video images 300, a deep neural network 800 can successfully identify and locate real world objects in real world color video data 300.

Figure 9:
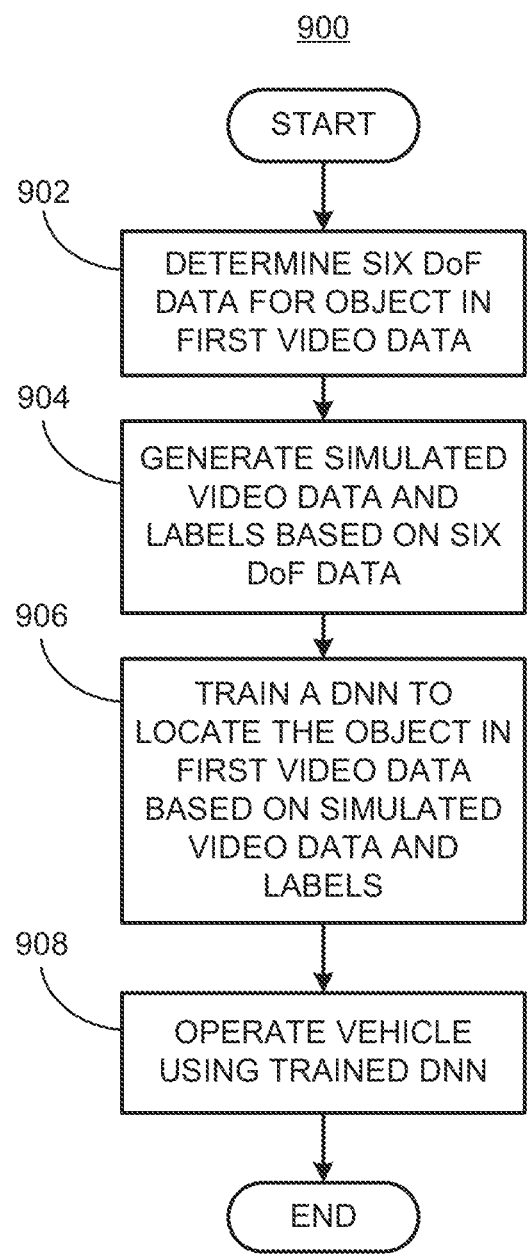
FIG. 9 is a flowchart diagram of an example process to operate a vehicle using a deep neural network.

FIG. 9 is a flowchart diagram of a process 900 described in relation to FIGS. 1-7, of a process 900 for training a deep neural network to operate a vehicle. Process 900 can be implemented by a processor of computing device, taking as input information from sensors, and executing commands, and outputting object information, for example. Process 900 includes multiple blocks that can be executed in the illustrated order. Process 900 could alternatively or additionally include fewer blocks or can include the blocks executed in different orders.

Process 900 begins at block 902, where a first color video image 300 is acquired. A computing device 115 can input the first color video image 300, and based on a CAD video image 400, determine a six DoF pose for a vehicle 302 included in a first color video image using a process of minimizing differences between locations of vehicle features 402 determined by processing the color video image 300 of the vehicle 302 as discussed above in relation to FIG. 4.

At block 904 the computing device 115 generates a synthetic video image 500 including a vehicle 502 and generates a label 604 based on the six DoF data generated at block 902 as discussed above in relation to FIG. 6. The label 604 can be transferred to a color video image 300 that includes an image of a vehicle 302. Label 604 includes data regarding the identity and location of the vehicle 302 can be used as ground truth regarding vehicle 302 because it is based on six DoF data acquired from color video image of vehicle 302.

At block 906 the computing device 115 uses color video image 300 and a synthetic video image 500 to train a GAN 700 to generate modified synthetic video images 706. The modified synthetic video images 706 are used to train a deep neural network 800. A deep neural network 800 is trained by backpropagating results from processing the input modified synthetic video image 706 a plurality of times and comparing the output states 810 to ground truth label 604. When the deep neural network generates output states 810 that equals the ground truth, the parameters used to generate the output states 810 are stored and saved as programming parameters for the trained deep neural network as discussed above in relation to FIG. 8.

At block 908 the computing device 115 uses the trained deep neural network 800 to operate a vehicle 110. The trained deep neural network 800 can be download to a computing device 115 in a vehicle 110 and then executed by the computing device 115. The computing device 115 can input color video images 300 from video sensors included in the vehicle 110 and input the acquired color video images 300 to the deep neural network 800. The deep neural network 800 can determine output states 810 corresponding to the identity and location of an object including a vehicle 302 in the field of view of the video sensor based on processing acquired color video data 300. Based on data regarding the location and orientation of a field of view of the video sensor, computing device can determine where an object including a vehicle 302 is in relation to the vehicle 110. The computing device 115 can determine a vehicle path that will permit the vehicle 110 to avoid contact with the object in the field of view. The computing device can issue commands to vehicle controllers 112, 113, 114 to operate the vehicle 110 by controlling vehicle powertrain, vehicle steering and vehicle brakes to control vehicle 110 based on a location of an object including a vehicle 302 in the acquired color video data 300 to travel along a determined vehicle path, where the vehicle path can be represented by a polynomial function. Following block 908 process 900 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising a processor; and
a memory, the memory including instructions executable by the processor to:
determine six degree of freedom (DoF) data for a first object in a first video image;
generate a synthetic video image corresponding to the first video image including a synthetic object and a synthetic object label based on the six DoF data;
train a generative adversarial network (GAN) based on a paired first video image and a synthetic video image to generate a modified synthetic image;
train a deep neural network to locate the synthetic object in the modified synthetic video image based on the synthetic object label; and
download the trained deep neural network to a computing device in a vehicle.

2. The computer of claim 1, wherein the synthetic video image is generated by photorealistic rendering to correspond with the first video image including rendering the synthetic object to correspond with an identity and location of the first object in the first video image based on the six DoF data.

3. The computer of claim 1, wherein the six DoF data includes a location in three-dimensional (3-D) space and an orientation in 3-D space, both determined with respect to orthogonal three-dimensional axes, wherein the orthogonal three-dimensional axes are determined with respect to a global coordinate system.

4. The computer of claim 3, wherein the global coordinate system is based on latitude, longitude, and altitude, location is measured in x, y, and z coordinates and orientation is measured by roll, pitch, and yaw specified with respect to the global coordinate system.

5. The computer of claim 1, the instructions including further instructions to determine the six DoF data by processing the first video image using machine vision techniques to determine correspondence between locations of first data points on the first object in the first video image, and locations of measured data points determined by measuring locations of data points on one or more of the first object or engineering drawings of the first object.

6. The computer of claim 5, the instructions including further instructions to determine the six DoF data by minimizing differences between locations of the first data points and the measured data points by non-linear curve fitting.

7. The computer of claim 6, the instructions including further instructions to determine the six DoF data based on engineering drawings of the first object and virtual camera point of view.

8. The computer of claim 7, wherein the virtual camera point of view includes six DoF data for an optical axis of the virtual camera and magnification data for the virtual camera.

9. The computer of claim 1, wherein the GAN includes a generative network and an adversarial network.

10. The computer of claim 1, wherein the GAN adds image feature data from the first video image to the synthetic video image to generate the modified synthetic video image.

11. The computer of claim 1, wherein the deep neural network includes convolutional layers and fully-connected layers.

12. The computer of claim 11, the instructions including further instructions to train the deep neural network to locate the first object by comparing back propagated output states with the synthetic object label.

13. The computer of claim 1, the instructions including further instructions to operate the vehicle by processing acquired video data with the downloaded deep neural network to locate one or more objects in the acquired video data.

14. The computer of claim 13, the instructions including further instructions to operate the vehicle by controlling vehicle powertrain, steering and brakes based on locations of the one or more objects in the acquired video data.

15. A method, comprising:
determining six degree of freedom (DoF) data for a first object in a first video image;
generating a synthetic video image corresponding to the first video image including a synthetic object and a synthetic object label based on the six DoF data;
training a generative adversarial network (GAN) based on a paired first video image and a synthetic video image to generate a modified synthetic image;
training a deep neural network to locate an object in the modified synthetic image based on the synthetic object label; and
download the trained deep neural network to a computing device in a vehicle.

16. The method of claim 15, wherein the synthetic video image is generated by a photorealistic rendering process to correspond with the first video image including rendering the synthetic object to correspond with a location of the first object in the first video image based on the six DoF data.

17. The method of claim 15, wherein the six DoF data includes a location in three-dimensional (3-D) space and an orientation in 3-D space, both determined with respect to orthogonal three-dimensional axes, wherein the orthogonal three-dimensional axes are determined with respect to a global coordinate system.

18. The method of claim 17, wherein the global coordinate system is based on latitude, longitude, and altitude, location is measured in x, y, and z coordinates and orientation is measured by roll, pitch, and yaw specified with respect to the global coordinate system.

19. The method of claim 15, further comprising determining the six DoF data by processing the first video image using machine vision techniques to determine correspondence between locations of first data points on the first object in the first video image and locations of measured data points determined by measuring locations of data points on one or more of the first object or engineering drawings of the first object.

20. The method of claim 19, wherein the instructions including further instructions to determine six DoF data by minimizing differences between locations of the first data points and the measured data points by non-linear curve fitting.

\* \* \* \* \*